Figure 1:
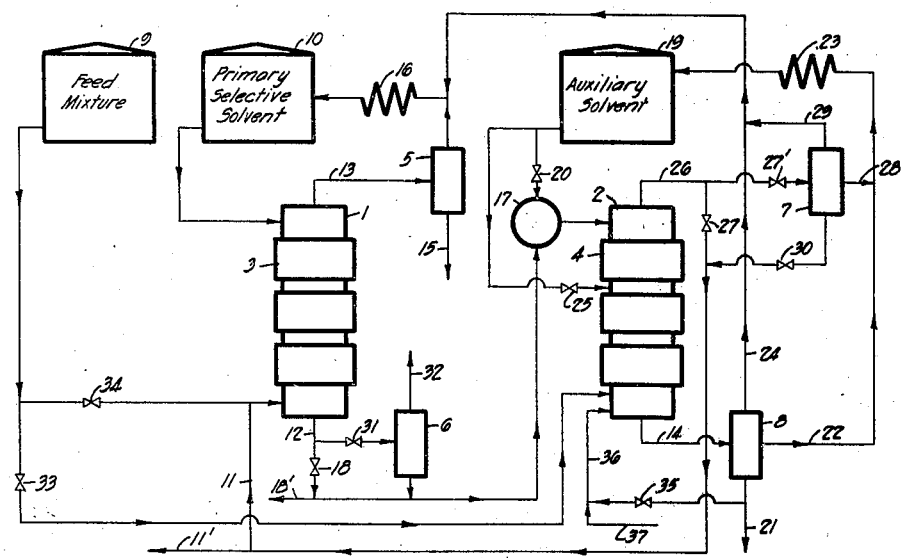

Inventors:
Donald S. McKittrick
Malcolm L. Perry
By their Attorney:

Patented Aug. 24, 1937

2,091,078

UNITED STATES PATENT OFFICE 2,091,078

EXTRACTION PROCESS

Donald S. McKittrick, Oakland, and Malcolm L. Berry, Berkeley, Calif., assignors to Shell Development Company, San Francisco, Calif., a corporation of Delaware Application February 19, 1936, Serial No. 64,736

8 Claims. (Cl. 196—13)

This invention relates to an improved process for the solvent extraction of liquid mixtures, and more specifically is concerned with an improvement therein according to which the mixture being extracted is treated in several contact zones with selective solvent to effect a more complete separation of its components. This process may be applied to the extraction of any liquid mixture of components, or to any mixture of components which may be brought into a liquid solution by the use of solvents, although one or more of the components may be normally solid, and finds especial application in the refining of hydrocarbon oils, such as lubricating oils, turbine oils, fuel oils, kerosene, etc., wherein a mixture of hydrocarbons is contacted with a selective solvent for aromatic or naphthenic hydrocarbons, or with a mixture of such selective solvents to wash out or extract certain components thereof, thereby forming two or more products.

In the known processes for extracting liquid mixtures, such as hydrocarbon oils, a solvent having a preferential solubility for non-paraffinic hydrocarbons is contacted with the initial hydrocarbon mixture, either in a batch operation, or in a series of mixers and settlers or in a packed tower, etc., to cause the formation of a raffinate phase and an extract phase, which are then separated and separately treated to recover the solvent. As an improvement on this process, it has been proposed to improve the degree to which the preferentially soluble components are removed from the raffinate by employing a greater quantity of solvent, or by repeatedly extracting the raffinate, as by adding more stages or by lengthening the contact zone in the case of a packed tower. It has also been proposed to extract the initial mixture or the raffinate repeatedly, employing different selective solvents for different components, or to reextract the raffinate with a selective solvent having a greater solvent power. All of these methods tend to improve the quality of the raffinate, e. g., they make the raffinate more paraffinic, in the case of the extraction of hydrocarbon oils. This intensive extraction of the raffinate, however, normally also removes a large proportion of the components which it is desired to retain in the raffinate, with the result that the raffinate yield is often unduly reduced.

To increase the yield of the raffinate, as well as to improve the quality of the extract, various methods have been proposed for treating the extract phase to recover from it those dissolved components which it is desired to recover as a part of the raffinate, or which, while not suitable for admixture with the raffinate, may yet be valuable as separate products, of a composition intermediate between the compositions of the raffinate and the extract. Thus, it has been proposed to contact the first extract phase produced in the main extraction zone with an auxiliary solvent which is capable of forming two secondary phases when mixed with the homogeneous extract phase, and which has solubility characteristics similar to the component of the mixture which is not preferentially dissolved by the main selective solvent. The secondary extract produced in this manner contains most of the main selective solvent and the most soluble components, and the secondary raffinate contains most of the auxiliary solvent and the less soluble components which were entrained in the first extract phase. The secondary raffinate phase may be withdrawn as a separate product, or may be introduced into the main extraction zone, where it is further treated together with the feed mixture, the least soluble components being eventually recovered as a part of the main raffinate phase.

It has, further, been proposed to employ in place of the auxiliary solvent a portion of the extract itself, from which all or a portion of the selective solvent has been removed, or a solvent having a composition similar to the extract. Such a material is known as a "backwash", and is flown countercurrently to and in contact with the extract phase, causing the latter to separate into secondary raffinate and extract phases, which may be disposed of as described above. Since, however, the backwash is at normal temperatures miscible with all components of the initial mixture, and is preferentially dissolved in the selective solvent, it is necessary to employ low temperatures to insure a countercurrent flow. These temperatures are often undesirably low, and increase the viscosity of the mixture being extracted, whereby the extraction is rendered difficult and, at times, impossible.

As a still further improvement on this process, it has been proposed to treat the extract phase by contacting the primary extract phase produced in an extraction zone both with a backwash and with an auxiliary solvent which is a solvent for the components which are not preferentially dissolved in the selective solvent, whereby these components are dissolved in the auxiliary solvent upon being liberated from the primary extract phase by the combined action of the backwash and of the auxiliary solvent.

It has heretofore been recognized that, in all of the above types of liquid-liquid countercurrent extraction, the separation is improved by employing the selective solvent under varying conditions, so that the solvent has a relatively high solvent power near the point of withdrawal of the raffinate phase from the process, and a relatively low solvent power near the point of withdrawal of the extract phase from the process. To bring about these conditions, it has heretofore been proposed to introduce the selective solvent into the system at a relatively high temperature, and to flow it through the successive stages of the extraction zone with a negative temperature gradient, whereby its solvent power is progressively lowered. We have found that this method is not entirely practical, because at elevated temperatures most selective solvents are less selective, in consequence of which the degree of separation which is effected in the extraction zone near the point of withdrawal of the raffinate phase is markedly lower; while at the point of the extraction zone where the extract phase is withdrawn the temperature must often be so low that undesirably high viscosities are obtained.

It is an object of our invention to provide a process for the liquid-liquid extraction of liquid mixtures, and particularly of liquid hydrocarbon oils, in which the solvent power of the selective solvent is lowered in the direction of flow of the solvent through the extraction zone without necessitating the use of such low temperatures as interfere with the practical operation of the process. It is a further object to provide an extraction process in which the solvent power of the selective solvent is substantially greater near the point of withdrawal of the raffinate phase than elsewhere in the system, without using such high temperatures as will unduly lower the selectivity of the selective solvent. Other objects of our invention will be apparent from the following specification.

According to the present invention, we have found that the degree of separation which is effected between the components of a mixture being extracted with a primary selective solvent can be improved by treating the mixture in a multi-stage process in which the primary selective solvent is caused to flow countercurrently to the mixture, or to certain components thereof, the primary selective solvent in the stage nearest the point of withdrawal of the ultimate extract phase being mixed with an auxiliary solvent which is preferentially dissolved in the primary selective solvent, and which lowers the solvent power of the primary selective solvent for the component(s) of the mixture which are not preferentially dissolved in the primary selective solvent.

This may be carried out in several ways. According to one embodiment of the invention, the initial mixture and the primary selective solvent are flowed countercurrently through an extraction apparatus comprising at least two extraction zones or stages, the extract phase from the first stage, i. e., the stage near the point of withdrawal of the raffinate from the apparatus being contacted with the fresh oil in the second stage in the presence of the auxiliary solvent. When the second stage itself consists of a countercurrent treating apparatus, the auxiliary solvent itself is flowed concurrently with the primary selective solvent.

According to another mode of applying our invention, the initial mixture is contacted with the selective solvent in one or more stages, preferably in a countercurrent manner, to produce primary extract and raffinate phases, the phases are separated, and the primary extract phase, together with the auxiliary solvent, is flowed countercurrently to a backwash, consisting of the solvent-free or solvent-poor portion of the ultimate extract, or a liquor of similar composition, or to a third solvent, which is capable of forming two liquid phases when contacted with the primary extract phase, whereby secondary raffinate and extract phases are formed.

As primary selective solvents, we may employ any solvent which is capable of forming two liquid phases when mixed with the mixture being extracted, and which is a preferential solvent for one of the components of the mixture. A wide choice of these selective solvents is known to the art, and the solvent to be used in a particular process is governed by the composition, volatility, and purity of the initial mixture, as well as by economic considerations. Thus, the solvents in Table I are generally suitable for the separation of hydrocarbon mixture, such as various petroleum fractions, into concentrates of paraffinic and naphthenic hydrocarbons, the latter term including unsaturated, aromatic, and similarly polarizable hydrocarbons:

Table I

Dichloroethyl ether (chlorex)
Furfural
Aniline
Phenol
Methyl cyanide
Methyl cellosolve
Acetaldehyde
Glycol monoacetate
Ethyl lactate
o, m, and p-toluidine The above solvents may be employed either alone, or in mixtures with one another, or in mixtures with solubility enhancing agents, of the type appearing in the following table:

Table II a. Polar organic compounds:
Cresylic acid
Octylaldehyde
Crotonaldehyde
Ethyl cyanide
Acrolein
Benzaldehyde
Petroleum nitrogen bases
b. Hydrocarbons:
Benzol
Naphthalene and other polycyclic hydrocarbons While substances of either subclasses a or b of Table II may be employed, we have found that it is generally more advantageous to employ the polar organic substances, which themselves possess some selective solvent properties.

The auxiliary solvent to be employed in our process must possess the selective solvent properties of the primary selective solvent to the extent of being less miscible with the component of the mixture not preferentially dissolved by the primary selective solvent or selective solvent mixture than said primary selective solvent itself. Suitable auxiliary solvents can be selected by those skilled in the art by noting the effect of adding the auxiliary selective solvent to an extract phase produced by extracting the mixture being treated with the primary selective solvent. To be suitable, this auxiliary solvent must be capable of forming two liquid phases when added to said extract phase, and must distribute itself between the two phases so as to be present predominantly in the phase which is rich in the primary selective solvent. In the extraction of hydrocarbon mixtures, it may be stated that generally the more highly polar a solvent is, the lower will be its solvent power for the paraffinic components or hydrocarbons of high hydrogen-carbon ratio. This solvent should, therefore, in this case be more polar than the primary selective solvent. A few examples of suitable auxiliary solvents are given below:

Table III

Ethylene glycol
Propylene glycol
Monoethanol amine
Nitromethane
Ethylene chlorhydrin
Acetic acid
Acetic anhydride Our invention is not, however, restricted to the specific solvents enumerated in the above tables, but may be operated with a great number of other selective solvents. Moreover, our invention is not restricted to the use of solvents according to the groups in which they are listed above, since it is often possible to employ as primary and auxiliary solvents two solvents appearing in the same table, the auxiliary solvent being, however, the solvent which has the lower solvent power for the component which is not preferentially dissolved.

Our invention, moreover, comprises the treatment of a liquid mixture of components in a plurality of extraction zones, in which different selective solvents are employed in the several stages, the solvents having a greater solvent power near the point at which the final raffinate is removed from the system, and the lowest solvent power near the point at which the extract is removed from the system, all as more particularly hereinafter described, and illustrated in the accompanying drawing, which are schematic flow diagrams of preferred embodiments of our invention, it being understood that our invention is not limited to the specific arrangements of apparatus indicated on the drawing, but may be practiced according to a great number of various embodiments.

Figure 2:
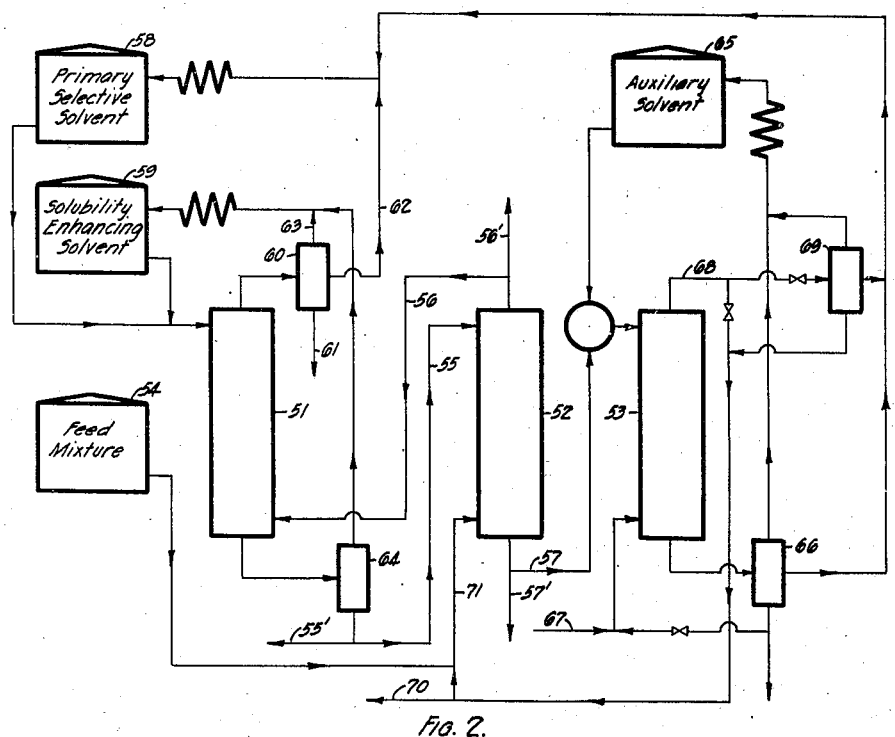

Referring to Figure 1, 1 and 2 are liquid contact apparatus, such as continuous or batch, single or multi-stage countercurrent treaters, constituting the first and second stages or extraction zones, which may, if desired, be provided with jackets 3 and 4 or other heat exchange devices through which a suitable cooling (or heating) medium may be circulated. These jackets may be constructed in sections, as shown, or may be continuous, and provided with suitable baffles so that a temperature gradient is maintained in the contact apparatus, the temperature being highest near the point of withdrawal of the raffinate phase, and lowest near the opposite end. 5, 6, 7, and 8, are separating apparatus, such as distilling or fractionating columns, or washing units, adapted to separate the solvent or solvents from the solutions treated therein. The various units are interconnected with suitable conduits, as indicated, and as more fully described below, and may be provided with pumps, valves, heat exchangers, and other auxiliary equipment, not shown.

The initial mixture to be extracted, containing components A and B (such as, e. g., a mixture of paraffinic and aromatic or naphthenic hydrocarbons, or a mixture of acetic acid and water, etc.) and a primary selective solvent for the component B (which may be liquid $SO_2$, or furfural, or a similar solvent selected from Table I or a mixture of a solvent selected from Table I together with a different solvent selected from either Table I or II, in the case of hydrocarbon oils) are introduced into the apparatus 2 and 1, respectively, form the tanks 9 and 10, the valve 34 being closed and the valve 33 open. The mixture and the solvent flow countercurrently through the system by means of conduits 11 and 12, under conditions of temperature to produce a raffinate phase, which is rich in the component A, which is withdrawn at 13, and an extract phase, which is rich in the selective solvent and in the component A, and is withdrawn at 14. A suitable temperature gradient which produces the optimum results at minimum expense may be maintained in the contact apparatus. The raffinate phase is treated in the separator 5, the solvent-free raffinate being withdrawn at 15, and the selective solvent being returned to the tank 10 through a condenser 16.

The extract phase is withdrawn from the apparatus 1 through the conduit 12, and may be introduced into a mixing device 17 through a valve 18. An auxiliary solvent which is a poorer solvent for the component A than the primary selective solvent is introduced from the tank 19 through the valve 20. In the extraction of hydrocarbon mixtures with polar selective solvents, this material may, for example, be a substance having a greater di-pole moment than the primary selective solvent, such as ethylene glycol, or any substance selected from Table III. A pure mixture of primary selective solvent and auxiliary solvent may or may not be a homogeneous solution; but it will be capable of causing the formation of two liquid phases when contacted with the extract withdrawn from the extraction zone 1, the auxiliary solvent being preferentially dissolved in the phase which contains the greater part of the primary selective solvent. The amount of the auxiliary solvent must be small enough to cause the second solvent to retain the greater part of the component B, since if an excess of this agent is added the second solvent may become substantially immiscible even with the component B, whereby the production of an extract in the desired amount is prevented.

The mixture of auxiliary solvent and primary extract is fed into the apparatus 2, where it is contacted, preferably in a countercurrent manner, with the fresh feed, to produce the ultimate extract phase and an intermediate raffinate phase. The extract phase is intermittently or continuously withdrawn at 14, and separated into extract and solvent portions in the apparatus 8, the extract portion being withdrawn at 21. The apparatus 8 may be operated in one or more stages to yield the auxiliary solvent at 21, which may be returned to the tank 19 through a condenser 23, and the primary selective solvent at 24. If desired, all or a portion of the auxiliary solvent may be fed into the apparatus 2 at an intermediate point, as through a valve 25.

The intermediate raffinate phase produced in the apparatus 2 is withdrawn at 26 and fed into the apparatus 1 through a valve 27 and the conduit 11. This phase will generally contain only small amounts of the auxiliary solvent, which will not appreciably affect the operation of the apparatus 1. If it is preferred to exclude this solvent entirely from the apparatus 1, this phase may be flowed through the valve 27' and treated in the separator 7 to remove the auxiliary solvent at 28, and, if desired, also the primary selective solvent at 29, intermediate raffinate being withdrawn through the valve 30 and introduced into the apparatus 2 through the conduit 11.

When the primary selective solvent from the tank 10 contains a solubility enhancing agent, it may often be desirable to exclude this agent from the extracting apparatus 2. This may be effected by closing the valve 18, and flowing the extract phase from the conduit 12 through a valve 31 and the separator 6, the solubility enhancing agent being withdrawn at 32. When the volatilities of the solubility enhancing agent and the selective solvent are such that the former cannot be separated from the extract phase without the simultaneous separation of the latter, an additional amount of the selective solvent from the tank 10 may be fed directly into the mixer 17 or into the apparatus 2.

As pointed out above, according to another mode of operating our process, the primary extract produced by extracting the initial mixture with the primary selective solvent or selective solvent mixture is contacted with a backwash in the presence of an auxiliary solvent. For this purpose, the valve 33 may be closed, and the feed introduced into the apparatus 1 through a valve 34. The primary extract phase withdrawn at 12 may then be introduced into the apparatus 2, if desired after the removal of the solubility enhancing agent in the separator 6, together with the auxiliary solvent introduced from the tank 19. A portion of the final extract produced at 21 is fed back to the apparatus 1 through a valve 35 and conduit 36. It is not essential that this backwash be entirely free from selective solvent, and the apparatus 8 need not be operated to produce pure extract. The temperature in the extraction zone 1 is such that the backwash will cause the extraction mixture therein to form two liquid phases, these phases being preferably contacted in a countercurrent manner.

Numerous modifications are possible in the practical operation of our process without departing from the scope thereof. For example, it is possible to use a third solvent in the apparatus 2 which is a solvent for the component A, in addition to, or in place of the backwash. This may, for example, be introduced at 37. In the extraction of hydrocarbon oils to produce a paraffinic raffinate, light paraffinic hydrocarbons, such as propane, butane, pentane, isopentane, and hexane may be employed. This auxiliary solvent must be capable, when combined with the primary extract and with the second solvent, of forming two liquid phases in the apparatus 2. It will be largely dissolved in the secondary raffinate phase, and may be carried into the apparatus 1 together with this phase, but is preferably separated therefrom in the separator 7.

Moreover, the process may be operated in any number of stages, and is not restricted to the two stages illustrated in Figure 1. Thus, in Figure 2, 51, 52 and 53 are the extraction apparatus, which may be similar to the apparatus 1 and 2, described above, and may be provided with means for establishing and maintaining a temperature gradient. The mixture to be extracted is introduced into one end of the apparatus 52 from the tank 54, where it is contacted in one or more countercurrent stages with an extract phase from the apparatus 51, introduced at 55, whereby raffinate and extract phases are formed, these being withdrawn at 56 and 57, respectively. The raffinate phase is introduced into the apparatus 51 and extracted with a first selective solvent mixture, consisting of a selective solvent from the tank 58 and a solubility enhancing agent from the tank 59. The final raffinate phase withdrawn from the apparatus 51 is treated in the separator 60 producing a raffinate portion and one, two or more solvent portions, which are withdrawn at 61, 62 and 63, respectively, the solvents being returned to the tanks through suitable condensers. The extract phase from the apparatus 51 is treated in the separator 64 to separate the solubility enhancing agent, and a mixture of extract and selective solvent introduced into the apparatus 52 to contact the fresh oil. The extract phase withdrawn at 57 is mixed with a solubility reducing agent, supplied from the tank 65, and treated in the apparatus 53 with a backwash from the separator 66, or with a similar solvent, or with a solvent for the component B, which may be introduced at 67, all as described above in connection with Figure 1. The raffinate phase produced in the apparatus 53 is withdrawn at 68, may be treated in the separator 69 to separate the solubility reducing agent and, if desired, the auxiliary solvent which has been supplied at 67, and the residual portion is withdrawn as an intermediate product at 70, or introduced into the apparatus 52 at 71.

As a specific example, hydrocarbon oil may be introduced from the tank 54, furfural from the tank 58, octylaldehyde from the tank 59, and ethylene glycol from the tank 65.

By the term "component", as used in the present specification and claims, is designated either portion of a liquid mixture which can be separated from each other with a solvent or with a solvent mixture. It will be evident that by the word "component" is meant not only one chemically pure substance, but that this word covers also a mixture of substances. A component is said to be pure when it does not contain any portion of a substance which should be present only in another component. In the present specification and claims there is no difference in meaning between the words "solution", "liquid mixture" and "liquid solution".

Although we have shown the preferred embodiment of our process, according to which a mixture is separated into two products, it should be noted that it is also possible to withdraw portions of the intermediate phases as additional products, as, for example, by withdrawing some of the intermediate raffinate from the conduit 11' of Figure 1 or 56' of Figure 2. Similarly, portions of the intermediate extracts may be withdrawn at 18' in Figure 1 and at 55' or 57' of Figure 2.

We claim as our invention:
1. The process for extracting a liquid mixture containing components A and B to remove the component B therefrom which comprises the steps of flowing a primary selective solvent for the component B countercurrently to the mixture through at least three extraction zones, introducing a solubility enhancing agent into the first stage nearest the point of withdrawal of the final raffinate phase, removing said solubility enhancing agent from the extraction mixture transferred from the first extraction zone to the second extraction zone, and introducing into the third extraction zone an auxiliary solvent which has a lower solvent power for the component A than the primary selective solvent and which is preferentially dissolved by said primary selective solvent.

2. The process according to claim 1, in which the initial liquid mixture is introduced into the second extraction zone.

3. The process according to claim 1, in which the initial liquid mixture is introduced into the third extraction zone.

4. The process according to claim 1 in which the auxiliary solvent is removed from the extraction mixture transferred from the third extraction zone to the second extraction zone.

5. The process for extracting a liquid hydrocarbon mixture containing hydrocarbon components which are relatively more paraffinic and less paraffinic, which comprises the steps of flowing a primary selective solvent for the relatively less paraffinic hydrocarbon component countercurrently to the mixture through at least three extraction zones, introducing a solubility enhancing agent into the first stage nearest the point of withdrawal of the final raffinate phase, removing said solubility enhancing agent from the extraction mixture transferred from the first extraction zone to the second extraction zone, and introducing into the third extraction zone an auxiliary solvent which has a lower solvent power for the relatively more paraffinic hydrocarbon component than the primary selective solvent and which is preferentially dissolved by said primary selective solvent.

6. The process according to claim 5 in which the solubility enhancing agent is an organic polar compound having a permanent dipole moment greater than that of dialkyl ethers.

7. The process according to claim 5 in which the selective solvent is furfural and the solubility enhancing agent is octylaldehyde.

8. The process according to claim 5 in which the selective solvent is furfural, the solubility enhancing agent is an organic polar compound having a permanent dipole moment greater than that of dialkyl ethers and the auxiliary solvent is an aliphatic glycol.

DONALD S. McKITTRICK.
MALCOLM L. BERRY.